United States Patent
Talukdar et al.

(10) Patent No.: US 11,340,967 B2
(45) Date of Patent: May 24, 2022

(54) HIGH AVAILABILITY EVENTS IN A LAYERED ARCHITECTURE

(71) Applicant: EMC IP Holding Company LLC, Hopkinton, MA (US)

(72) Inventors: Rohit Talukdar, Bangalore (IN); Pankaj Singh, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/016,476

(22) Filed: Sep. 10, 2020

(65) Prior Publication Data
US 2022/0075671 A1  Mar. 10, 2022

(51) Int. Cl.
*G06F 9/54* (2006.01)
*G06F 11/20* (2006.01)

(52) U.S. Cl.
CPC .............. *G06F 9/542* (2013.01); *G06F 9/544* (2013.01); *G06F 9/545* (2013.01); *G06F 11/203* (2013.01)

(58) Field of Classification Search
CPC .............. G06F 11/2023; G06F 11/2028; G06F 11/203; G06F 11/2033; G06F 11/2094; G06F 9/45558; G06F 2009/4557; G06F 2009/45575
See application file for complete search history.

(56) References Cited

U.S. PATENT DOCUMENTS

| | | | | |
|---|---|---|---|---|
| 2007/0022314 | A1* | 1/2007 | Erasani | G06F 11/1425 714/4.1 |
| 2007/0294563 | A1* | 12/2007 | Bose | G06F 11/2092 714/5.11 |
| 2013/0139219 | A1* | 5/2013 | Cai | G06F 11/0709 726/3 |
| 2017/0123836 | A1* | 5/2017 | Nagy | G06F 9/4806 |
| 2018/0095855 | A1* | 4/2018 | Sanakkayala | G06F 11/3495 |
| 2019/0310924 | A1* | 10/2019 | Peng | G06F 11/2025 |
| 2020/0334113 | A1* | 10/2020 | Sanakkayala | G06F 11/301 |
| 2021/0011776 | A1* | 1/2021 | Thirumalai | H04L 67/1095 |
| 2021/0081287 | A1* | 3/2021 | Koning | H04L 67/1097 |

OTHER PUBLICATIONS access.redhat.com, "1.3. Pacemaker Overview," https://access.redhat.com/documentation/en-us/red_hat_enterprise_linux/7/html/high_availability_add-on_overview/s1-pacemakeroverview-haao, Retrieved from the Internet: Oct. 22, 2020, 2 pages.
kubernetes.io, "1Options for Highly Available topology," https://kubernetes.io/docs/setup/production-environment/tools/kubeadm/ha-topology/, Retrieved from the Internet: Oct. 22, 2020, 2 pages.

* cited by examiner

*Primary Examiner* — Brian W Wathen
(74) *Attorney, Agent, or Firm* — Amin, Turocy & Watson, LLP

(57) ABSTRACT

Techniques are provided for high availability events in a layered architecture. In an example two computing nodes coordinate to provide a computing service, where each node has a base operating system configured to fence the other base operating system, and an application configured to fence the other application. In some examples, fencing requests by an application are routed through its base operating system, which coordinates application-level fencing requests and operating system-level fencing requests.

20 Claims, 13 Drawing Sheets

HIGH AVAILABILITY EVENTS IN A LAYERED ARCHITECTURE

TECHNICAL FIELD

The present application relates generally to high availability events (sometimes referred to as high-availability events) in a layered computer architecture.

BACKGROUND

A high-availability event can comprise an occurrence or action that is processed by a computer within a short amount of time. A computer application or service that processes high-availability events can be referred to as a high-availability application, or a high-availability service. A high-availability application (or service) can be an application that executes on a group of computers (sometimes referred to a computer cluster) that is architected to minimize downtime of the application. Downtime can be minimized by providing redundant capabilities across multiple computers of the group of computers, so that the application can still operate when a subset of the redundant-capability computers fails. In some examples of high-availability applications, monitoring can be performed to identify that a computer of the group has failed in providing the application, and in response, that application can be restarted on another computer of the group

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
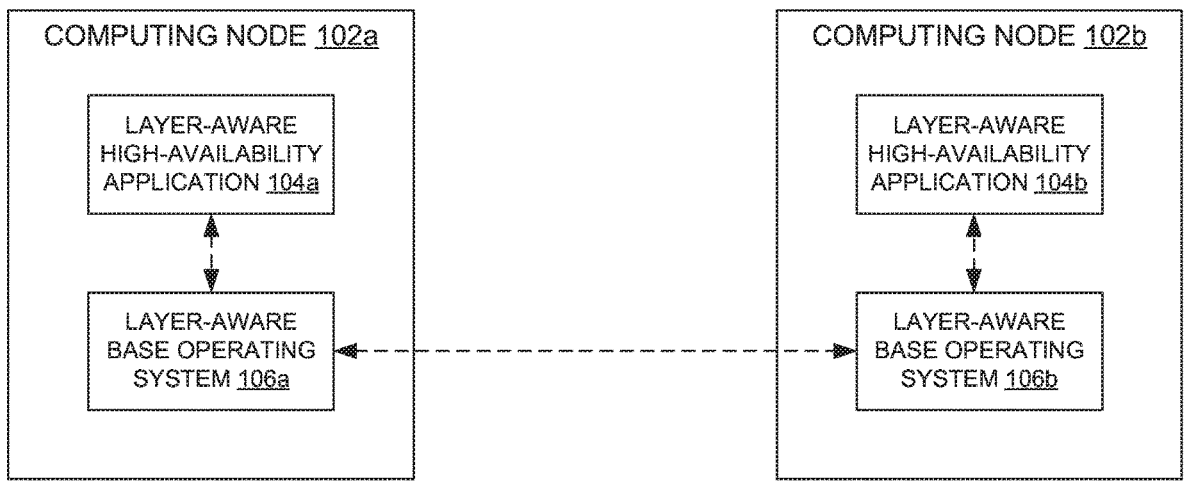
FIG. 1 illustrates an example system architecture that can facilitate high-availability events in a layered architecture, in accordance with certain embodiments of this disclosure.

In some examples, production-level applications can be run on virtual machines, or directly on a host operating system of a computer (sometimes referred to as a bare metal system). These applications can include high-availability applications that can be configured to operate with a maximum amount of uptime, or availability. One way that a high-availability application can be implemented is by configuring the application across multiple computers (which can form a computer cluster), where if one instance of the application (or its hosting hardware) fails, another instance of the application can continue providing the service of the high-availability application. A high-availability event can be an event that results in a need to take a high-availability action, such as an application or its hosting hardware failing. A high-availability action can comprise fencing, unfencing, and killing a node, as described herein.

With the advent of containers, high-availability applications can be implemented in a container context. A container can generally comprise a collection of an instance of the application, along with a runtime environment, system tools, system libraries, and settings involved in executing the application. A container can omit an operating system, and instead utilize a base operating system of the computer upon which the container executes.

In a containerized environment, it can be that a base operating system has its own high-availability mechanism to handle failover (where one node takes on the responsibilities of another node; this can be at the application level or the base operating system level) from one instance of the application to another instance. Then, the application itself can have its own high-availability mechanism to handle failover.

Having multiple high-availability mechanisms at different layers (the application layer and the base operating system layer) that operate independently of each other can cause problems. For example, this architecture can lead to a complex high-availability logic where the underlying base operating system layer could be executing its own high-availability logic independent of the application layer, and vice versa.

In an example, a high-availability application can be a network storage application, such as one that provides network attached storage (NAS) to one or more remote computers via a network file system (NFS) or server media block (SMB) protocol. In an example, different instances of a high-availability application that execute in different containers on different computers of a computer cluster can provide storage access to different parts of a file system made available via SMB. Where one of these high-availability application instances that provides access to a particular part of the storage fails, the system can failover such that another instance of the high-availability application begins providing storage access to that particular part of the storage.

There can be different types of system architectures for high-availability applications. Examples of these system architectures include using a second network, using shared storage, and using an external monitor. These system architectures can be suitable for high-availability applications across two computers in a computer cluster. However, in some examples, these system architectures might not be suitable to work in a dual-layer clustered environment, where one cluster layer operates on top of another cluster layer.

In an example according to the present techniques, a layered cluster system architecture can be implemented, where the base operating system layer and the application layer each have an independently-evolved architecture. Hence, each of these layers can have its own notion of its cluster.

Examples of current high-availability architectures can suffer problems when applied to a layered cluster architecture. These problems can apply to both a two-node system, as well as systems that incorporate more than two nodes.

Take an example of two computers, computer 1 with base operating system 1 and application 1, and computer 2 with base operating system 2 and application 2. There can be a possibility that base operating system 2 is fencing (performing a high-availability action where one node kills another node before failover) base operating system 1, while application 1 is fencing application 2 at the same time. That is, computer 2 is attempting to fence computer 1 at the operating system layer, while at the same time, computer 1 is attempting to fence computer 2 at the application layer. So, computer 1 and computer 2 are attempting to fence each other, at different layers. In such an example, the application can suffer from data unavailability (where data is unavailability to a user or a client) because the application can be down on both nodes at the same time.

Another problem can stem from a confirmation of application fencing. In some examples, an application does not take the responsibility, or services, of the other application until it receives a successful fence response. Where an application fence request relies upon base operating system, it can be possible that a fence request as failed or will not reach the other node. Where this happens, this can lead to a disruption of services provided by the application.

Then, another problem can stem from a base operating system being down on one node leading to data unavailability of application services. A base operating system can go down due to several reasons—e.g., a system panic, a system hang, a reboot, or a base operating system fencing. In the two computer example above, base operating system 1 can go down. Then, application 2 can detect a failure of application 1 due to a loss of a heartbeat message that application 1 periodically sends to application 2 when application 1 is properly functioning. In response to detecting this failure, application 2 can detect a fence request to take up the services of application 1, but the fence request will fail because base operating system 1 is down. Hence, this condition can result in data unavailability.

A solution to one or more of these problems with high-availability applications in a layered clustered environment can be as follows. Base operating system high-availability mechanisms can keep track of both application states and base operating system states. Hence, a base operating system going down on one node will not result in data unavailability of application services. From the perspective of an application's high-availability mechanism, this is handled by the application's underlying base operating system, which can handle a situation as follows.

If a peer application is already down, the base operating system can return success to its application for any fencing request. Examples where a peer application is already down can include, that the peer application panicked and/or self-fenced; that the peer application rebooted; that the peer application was killed—either manually or by some other process; and that the peer application was already fenced. In these examples, a base operating system can query another base operating system that hosts the peer application to determine whether the peer is fenced or otherwise down.

Other examples where a peer application is already down can include, that the peer application's base operating system panicked; that the peer application's base operating system rebooted; and that the peer application's base operating system was already fenced. In these examples, a base operating system can already know that its peer base operating system (that hosts the peer application) is already fenced or otherwise down, such as because base operating systems implement a heartbeat mechanism to communicate about their status.

If a peer application is already up, then the base operating system can attempt to fence the peer application, and return success for a successful fencing. As used herein, "peer" can refer to another node at the same layer—e.g., at the application layer of both nodes, or at the base operating system layer of both nodes.

Where a fence is attempted in the opposite direction at the same time (two fences are attempted in opposite directions), a base operating system can make a decision to allow one fencing request and disallow the other fencing request so that only one of the two applications is fenced. A default policy can be to fail application fencing, which can prevent data unavailability of the application service.

In some examples, failover can happen only once an application gets a success confirmation from its application fencing mechanism. Hence, there can be two type of fencing actions to facilitate a fencing action taken by a base operating system—a soft fencing and a hard fencing. A soft fence can comprise fencing the application, or its container. A hard fence can comprise fencing a base operating system.

An implementation abstraction of the type of fence, can help separate implementation details of fencing from the indent of the application, where it can be irrelevant to the application as to how the fencing is implemented, so long as the result of fencing is obtained. So, a base operating system can effectuate an application's high-availability fencing application, and escalate from soft fencing to hard fencing if the soft fencing fails. In some examples, a hard fence will definitely fence the other node where it power cycles the other node's base operating system.

That is, a soft fence can involve stopping the application or its container only, with no impact on the base operating system. A soft fencing can fail, such as where the application is waiting on a data storage operation to complete. A hard fence can then involve power cycling the base operating system. In a power cycle, a base operating system's services can all go down, and failover to the other node, including high-availability application services. Thus, a hard fence can be more definitive than a soft fence, because it is more likely to succeed.

In some examples, after a failover to the other node, unfencing can be performed. Unfencing can be a high-availability action where a node brings back another node once failover completes.

In some examples, a base operating system can start an application in a catastrophic failure situation. A catastrophic failure can be a scenario where all application nodes are down, or if there is no live node in the application cluster.

Example Architectures, State Diagrams, and Signal Flows

FIG. 1 illustrates an example system architecture 100 that can facilitate high-availability events in a layered architecture, in accordance with certain embodiments of this disclosure. System architecture 100 generally contains an architecture where each node comprises a base operating system, and a container in which a high-availability application is running. It can be appreciated that this architecture is an example architecture, and there can be other system architectures to which these techniques for high-availability events in a layered architecture can be applied. For instance, there can be examples to which these techniques for high-availability events in a layered architecture can be applied where a node comprises a hypervisor and a virtual machine in which a high-availability application executes, or a high-availability application executes on a node's operating system, outside of a virtual machine or a container.

System architecture comprises computing node 102a and computing node 102b. In turn, computing node 102a comprises layer-aware high-availability application 104a and layer-aware base operating system 106a. Then, computing node 102b comprises layer-aware high-availability application 104b and layer-aware base operating system 106b.

Figure 2:
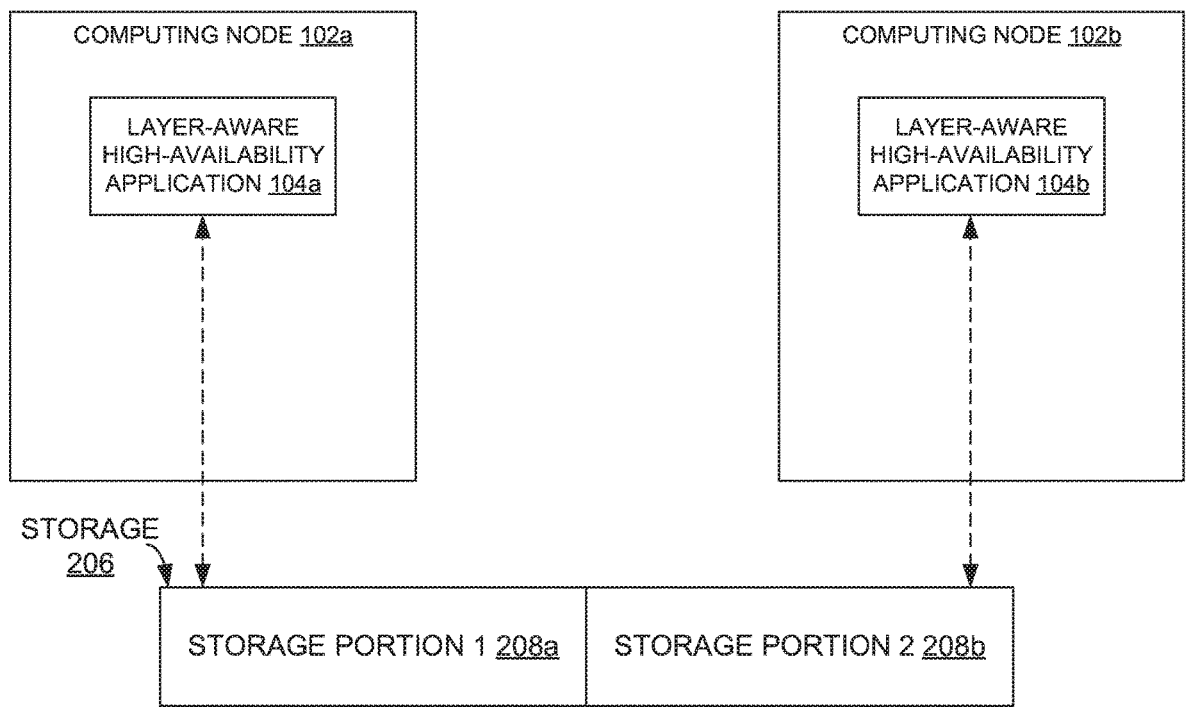
FIG. 2 illustrates another example system architecture that can facilitate high-availability events in a layered architecture, in accordance with certain embodiments of this disclosure.

Layer-aware high-availability application 104a and layer-aware high-availability application 104b can coordinate to provide a high-availability application, or service, such as described with respect to FIG. 2.

As part of providing a high-availability service, layer-aware high-availability application 104a and layer-aware high-availability application 104b can each be configured to fence each other directly. Similarly, layer-aware base operating system 106a and layer-aware base operating system 106b can each be configured to fence each other directly.

This ability to independently fence at two layers—the application layer and the operating system layer—can create problems with concurrent fences at different layers. So, in system architecture 100, each of layer-aware high-availability application 104a and layer-aware high-availability application 104b can route their fencing requests through their respective base operating system. Each base operating system can then coordinate fencing requests from both layers, so as to avoid problems relating to concurrent fences at different layers.

FIG. 2 illustrates another example system architecture 200 that can facilitate high-availability events in a layered architecture, in accordance with certain embodiments of this disclosure. As depicted, system architecture 200 comprises node 202a, node 202b, layer-aware application 204a, layer-aware application 204b, computer storage 206, computer storage portion 1 208a, and computer storage portion 2 208b.

In some examples, computing node 202a and computing node 202b can be similar to computing node 102a and/or computing node 102b of FIG. 1; and layer-aware application 204a and layer-aware application 204b can be similar to layer-aware high-availability application 104a and layer-aware high-availability application 104b. Computer storage 206 can be computer storage that is implemented with aspects of computer 1302 of FIG. 13; and computer storage portion 1 208a and computer storage portion 2 208b can each be a subset of computer storage 206.

Layer-aware application 204a and layer-aware application 204b can coordinate to offer a computing service, which in this example is access to computer storage 206. Layer-aware application 204a can offer access to computer storage portion 1 208a, and layer-aware application 204b can offer access to computer storage portion 1 208b.

When one of the applications is fenced, the other application can take over its services. For example, take the scenario where layer-aware application 204a fences layer-aware application 204b. After layer-aware application 204b is fenced, then layer-aware application 204a can begin providing the former service provided by layer-aware application 204b. That is, after layer-aware application 204b is fenced, then layer-aware application 204a can provide access to both computer storage portion 1 208a and computer storage portion 2 208b.

Figure 3:
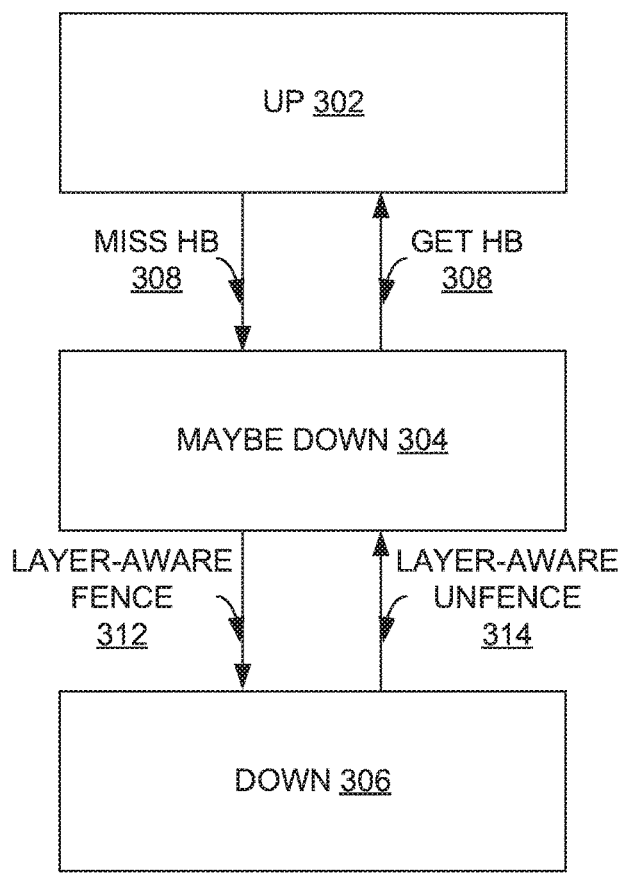
FIG. 3 illustrates an example state diagram for high-availability events in a layered architecture, in accordance with certain embodiments of this disclosure.

FIG. 3 illustrates an example state diagram 300 for high-availability events in a layered architecture, in accordance with certain embodiments of this disclosure. In some examples, state diagram 300 can be a state diagram for a high-availability application, such as layer-aware high-availability application 104a or layer-aware high-availability application 104b of FIG. 1, a state diagram for a base operating system, such as layer-aware base operating system 106a or layer-aware base operating system 106b of FIG. 1, or a state diagram for a computing node, such as computing node 102a or computing node 102b of FIG. 1. State diagram 300 can indicate the state of an entity that leads to a fencing attempt to be made.

It can be appreciated that the example of state diagram 300 illustrates three states—up 302, maybe down 304, and down 306—and there can be example state diagrams that utilize a different number of states. State up 302 can indicate that, for a first application or base operating system, a second application or base operating system (of the same layer, in some examples) believes that the first application or base operating system is properly functioning, because it has received a heartbeat message from the first application or base operating system within a defined recent amount of time—e.g., the last 5 seconds. Where these periodic heartbeat messages are regularly received, state diagram 300 can remain in state up 302 for the application or base operating system.

Where a heartbeat message is not received within a defined recent amount of time—as indicated by missed heartbeat 308—state diagram 300 can transition from state up 302 to state maybe down 304. State maybe down 304 can indicate that that a second application or base operating system is unsure whether a first application or base operating system is up or down. Where a heartbeat message is received while state diagram 300 is in state maybe down 304, state diagram 300 can transition to state up 302 (as indicated by get heartbeat 310). While in state maybe down 304, a layer-aware fence can be initiated (as indicated by layer-aware fence 312) to fence the other application or base operating system.

Where layer-aware fence 312 succeeds, state diagram 300 can transition from state maybe down 304 to state down 306. State down 306 can indicate that the other application or base operating system is down. In some examples, where a base operating system is down, the application it hosts will also be down. State diagram 300 can transition from state down 306 to state maybe down 304 where layer-aware unfence 314 is successfully performed. Then, after a fence and an unfence, where a heartbeat is received again, state diagram 300 can transition from state maybe down 304 to state up 302.

Example Signal Flows and Process Flows

Figure 4:
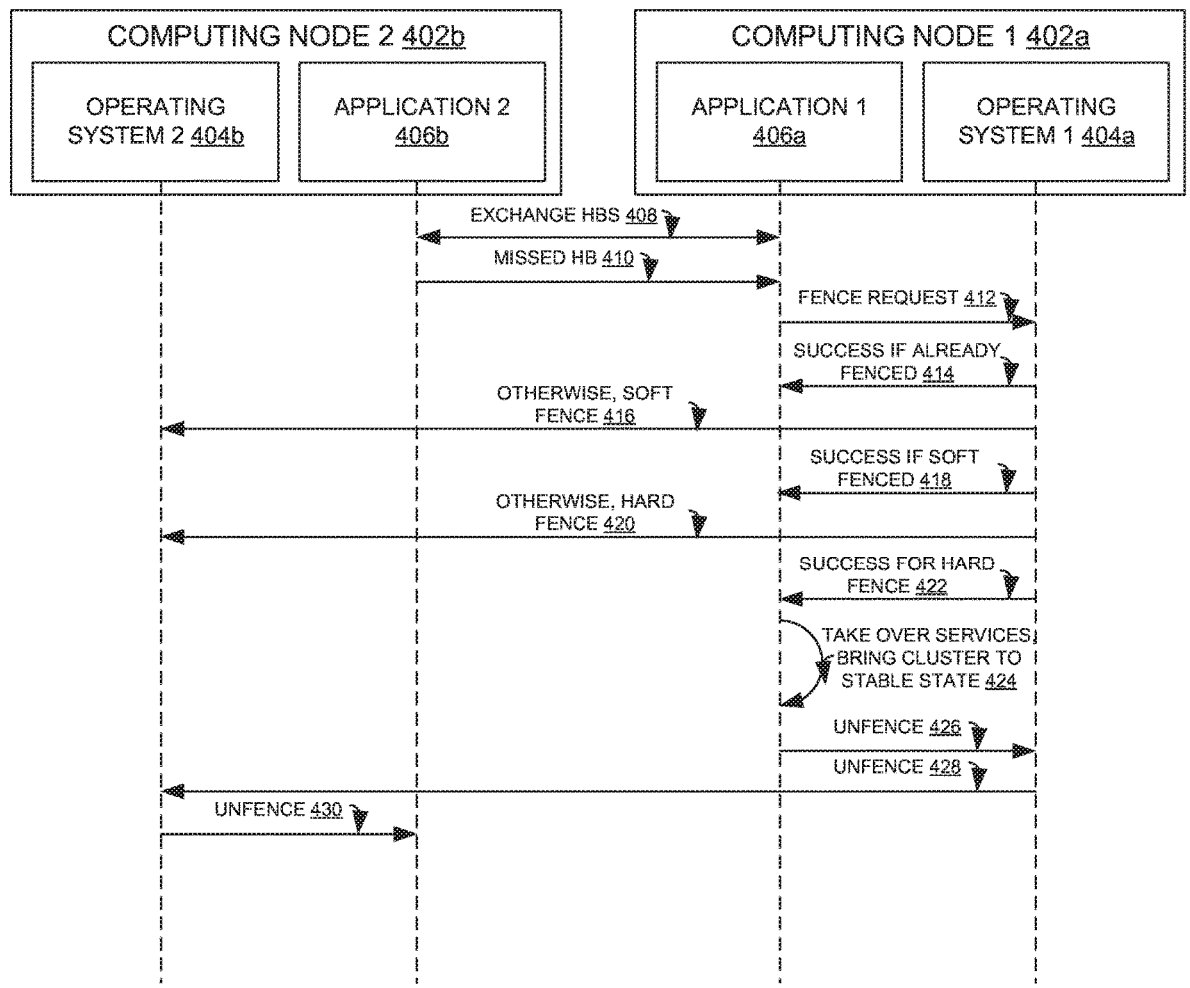
FIG. 4 illustrates an example signal flow for high-availability events in a layered architecture, in accordance with certain embodiments of this disclosure.

FIG. 4 illustrates an example signal flow 400 for high-availability events in a layered architecture, in accordance with certain embodiments of this disclosure. As depicted, the signals of signal flow 400 are sent between node 1 402a (comprising base operating system 1 404a and application 1 406a) and node 2 402b (comprising base operating system 2 404b and application 2 406b). In some examples, node 1 402A can be similar to node 102a; base operating system 1 404a can be similar to layer-aware base operating system 106a; application 1 406a can be similar to layer-aware high-availability application 104a.

Figure 5:
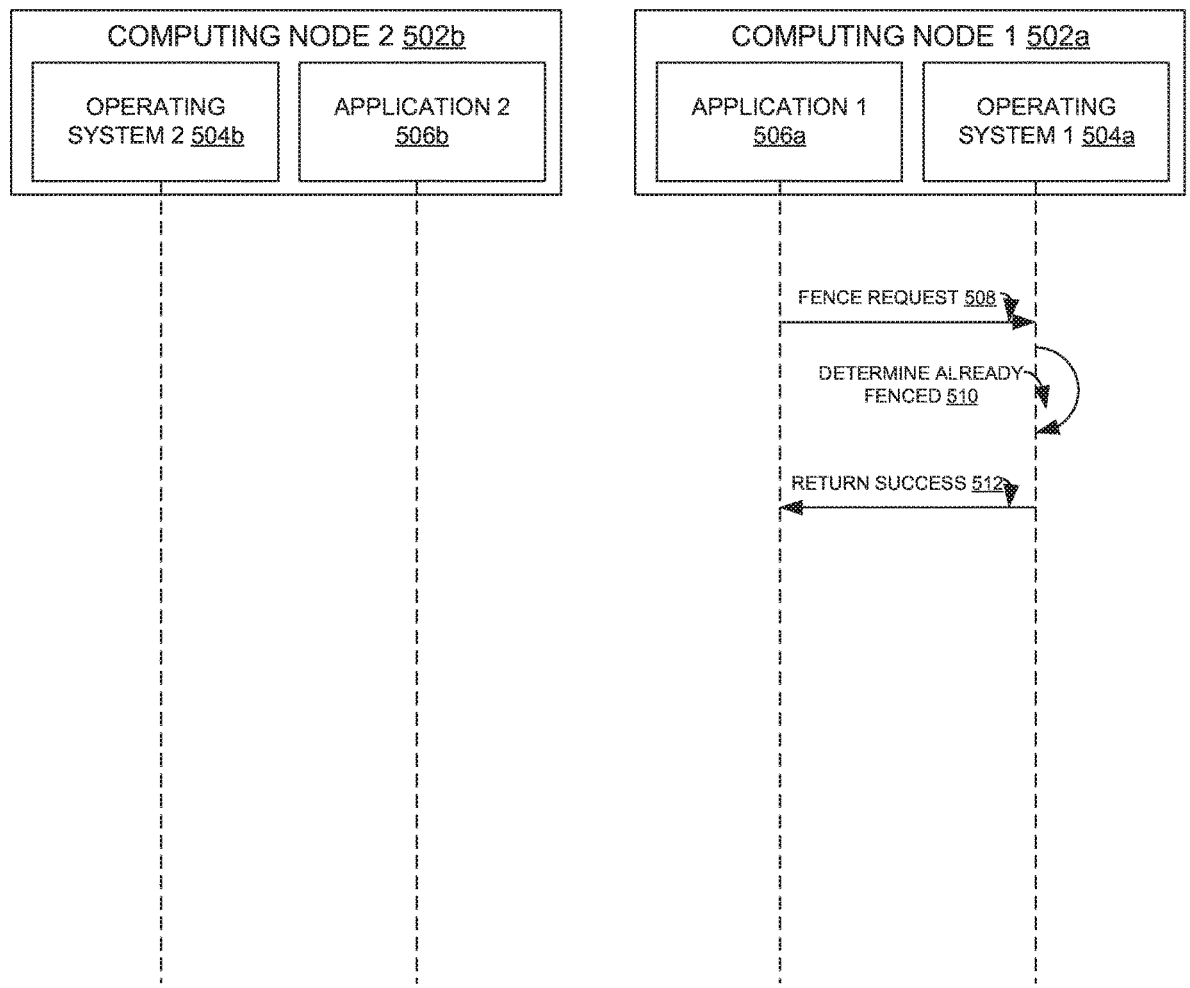
FIG. 5 illustrates an example signal flow for high-availability events in a layered architecture where an application is already fenced, in accordance with certain embodiments of this disclosure.
Figure 6:
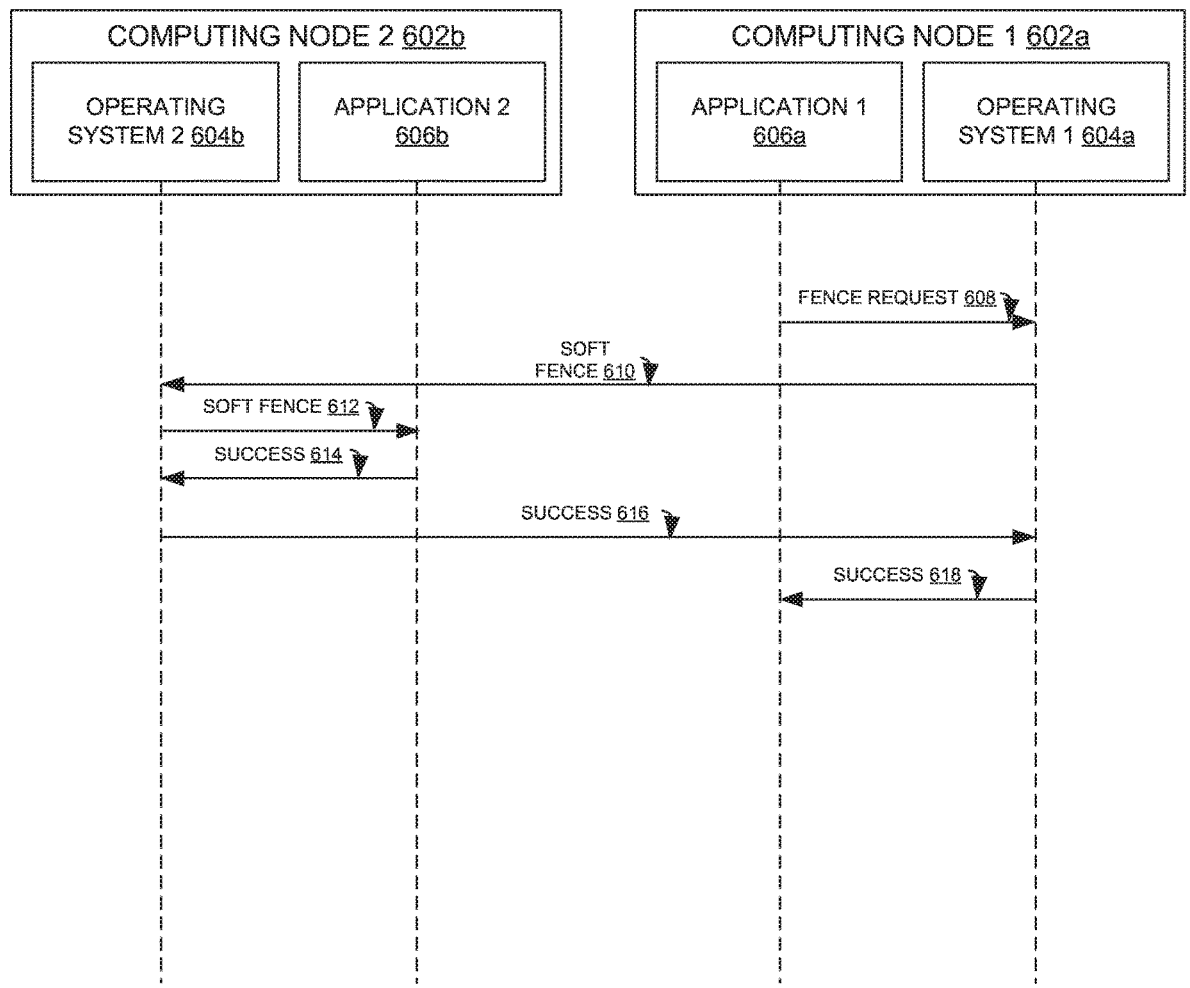
FIG. 6 illustrates an example signal flow for high-availability events in a layered architecture where a soft fence is used, in accordance with certain embodiments of this disclosure.
Figure 7:
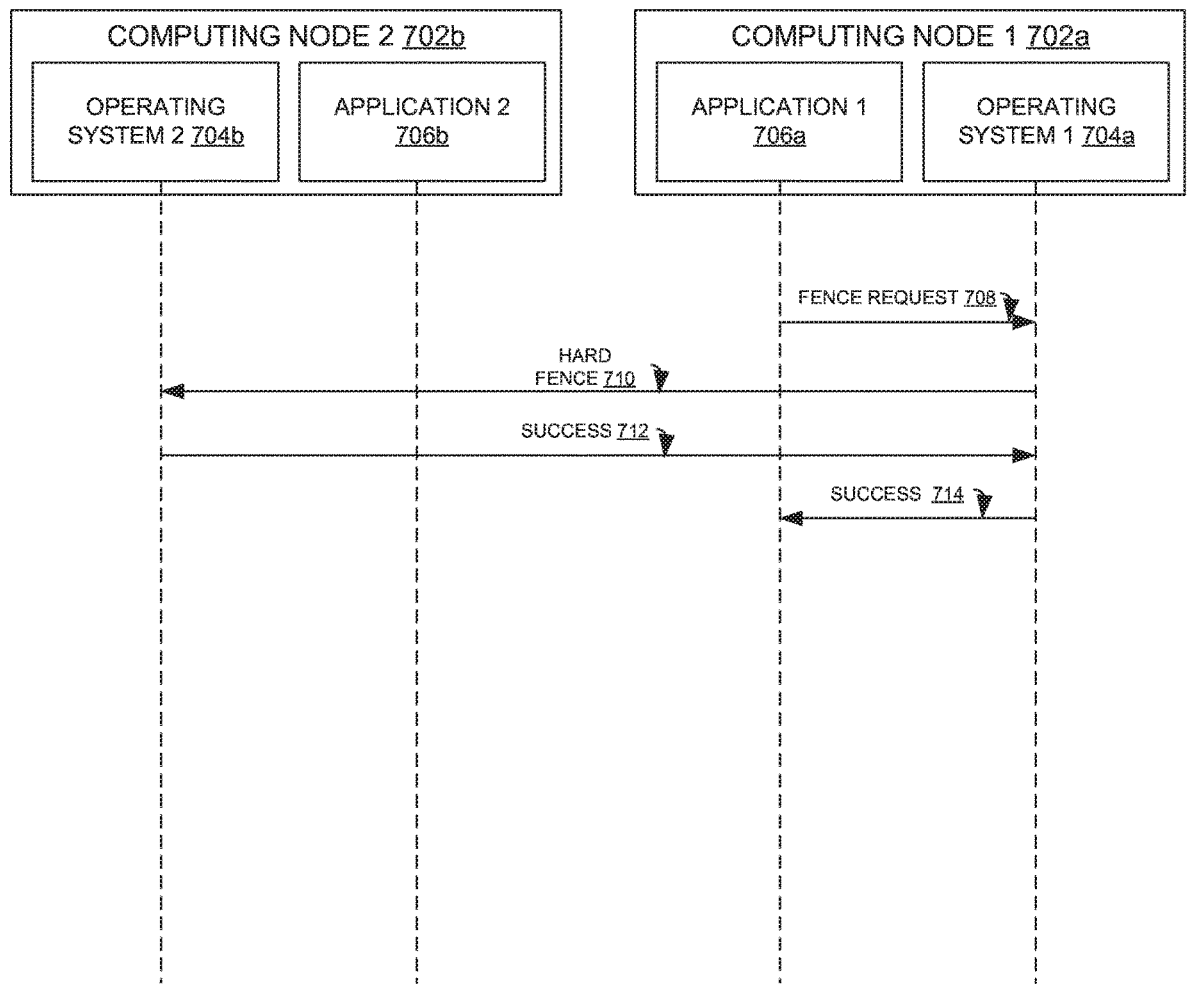
FIG. 7 illustrates an example signal flow for high-availability events in a layered architecture where a hard fence is used, in accordance with certain embodiments of this disclosure.
Figure 8:
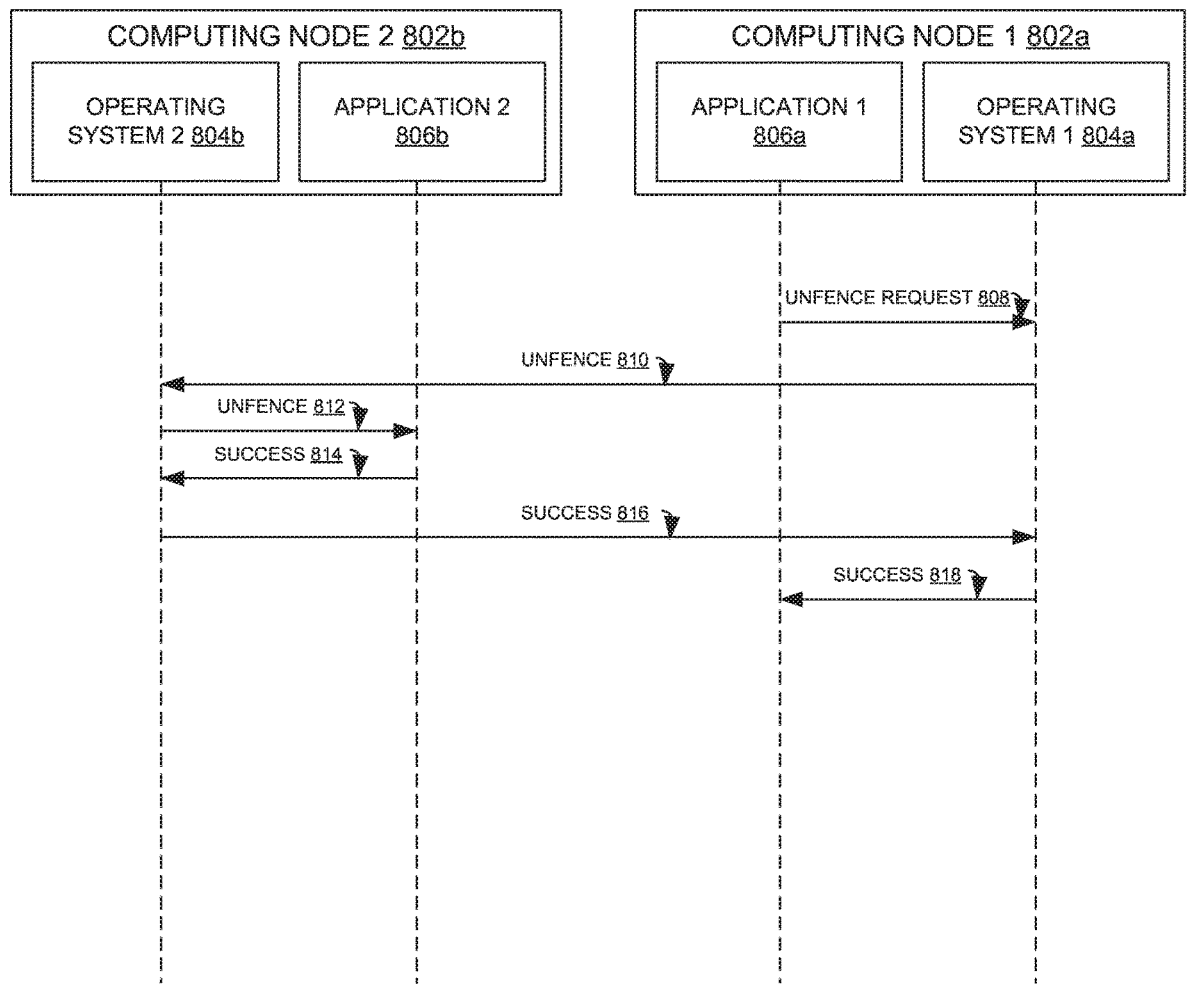
FIG. 8 illustrates an example signal flow for high-availability events in a layered architecture where an application is unfenced, in accordance with certain embodiments of this disclosure.

In some examples, aspects of signal flow 400 can be combined with aspects of signal flow 500 of FIG. 5, signal flow 600 of FIG. 6, signal flow 700 of FIG. 7, and signal flow 800 of FIG. 8.

In signal flow 400, application 1 406A and application 2 406B exchange heartbeats 408. As depicted in the example of signal flow 400, at some point application 1 406A fails to receive a heartbeat message from application 2 406B within a prescribed amount of time, as indicated by missed heartbeat 410.

As a result of that missed heartbeat, application 1 406A sends a fence request 412 to base operating system 1 404A to fence application 2 406B. Base operating system 1 404A receives this fence request and processes it accordingly.

Where application 2 406B has already been fenced, base operating system 1 404A returns a fencing successful message 414 to application 1 406A. An example of where application 2 406B has already been fenced can be where base operating system 1 404A has already fenced base operating system 2 404B (which hosts application 2 406B) because base operating system 1 404A did not timely receive a heartbeat message from base operating system 2 404B.

If application 2 406B has not already been fenced, base operating system 1 404A can send a request to base operating system 2 404B to perform a soft fence—that is, to fence application 2 406B. Base operating system 2 404B can process this soft fence request by attempting to shut down application 2 406B (or a container in which application 2 406B operates). In some examples, a soft fence attempt can fail. For instance, an application might not be able to be terminated while it is waiting for an input/output operation (such as storage to disk) to complete.

Base operating system 2 404B can send an indication to base operating system 1 404A that indicates whether the soft fence succeeded. Where the soft fence succeeded, base operating system 1 404A can return success for the soft fence 418 to application 1 406A. Where the soft fence succeeded, base operating system 1 404A can request 420 that base operating system 2 404B perform a hard fence.

In some examples, where it is determined that a hard fence request will be implemented (or the base operating system is already fenced), base operating system 1 404A can return success for the hard fence 422 to application 1 406A. In other examples, base operating system 1 404A can wait until it has confirmed that a hard fence has been performed on base operating system 2 404B to return success for the hard fence 422 to application 1 406A.

In response to determining that application 2 406A has been fenced, application 1 406A can take over application 2 406B's services, and bring the cluster to a stable state 424. For example, where application 1 406A and application 2 406B are instances of a high-availability network storage application, where each application instance provides storage services to part of the available storage, this can comprise application 1 406A providing a service to access the portion of the available storage previously serviced by application 2 406B. Bringing the cluster to a stable state can comprise ensuring that all services that are to be offered by the application instances are being offered by the application instances.

After application 1 406A has taken over application 2 406B's services, and bring the cluster to a stable state 424, application 1 406A requests an unfence 426 from base operating system 1 404A. Base operating system 1 404A sends the request to unfence 428 to base operating system 2 404B. Where a soft fence has been performed, application 2 406B (which can include its container) has been stopped. Where a hard fence has been performed, it can be that base operating system 2 404B restarted without also restarting application 2 406B. In both examples, unfencing per request to unfence 428 can comprise base operating system 2 404B restarting application 2 406B (and its container, where appropriate. This can be accomplished via unfence 430.

After unfence 430, a fencing of application 2 406B that was initiated by application 1 406A (because of missed heartbeat 410) can be completed, and application 2 404B can be returned to normal execution, though in some examples application 2 404B is not currently providing any services as part of a high-availability application (because they have been taken over by application 1 404A).

FIG. 5 illustrates an example signal flow 500 for high-availability events in a layered architecture where an application is already fenced, in accordance with certain embodiments of this disclosure. As depicted, the signals of signal flow 500 are sent between node 1 502A (comprising base operating system 1 504A and application 1 506A) and node 2 502A (comprising base operating system 2 504A and application 2 506A). In some examples, node 1 502A can be similar to node 1 402A of FIG. 4; base operating system 1 504A can be similar to base operating system 2 404A of FIG. 4; application 1 506A can be similar to application 1 406A of FIG. 4; node 2 502B can be similar to node 2 402B of FIG. 4; base operating system 2 504B can be similar to base operating system 2 404B of FIG. 4; and application 2 506A can be similar to application 1 406A of FIG. 4.

In some examples, aspects of signal flow 500 can be combined with aspects of signal flow 400 of FIG. 4, signal flow 600 of FIG. 6, signal flow 700 of FIG. 7, and signal flow 800 of FIG. 8.

Application 1 506A can send fencing request 508 to operating system 1 504A to fence application 2 506B. A reason that this can happen is that application 1 506A and application 2 506B have been exchanging heartbeat messages (such as exchange heartbeats 408 of FIG. 4), and application 1 506A has not received a heartbeat message from application 2 506A within a prescribed amount of time (such as missed heartbeat 410 of FIG. 4).

In response to receiving fencing request 508, operating system 1 504A can determine that application 2 506B has already been fenced. For example, node 1 502A and node 2 502B can be configured to fence each other at multiple layers—they can fence each other at the application layer between application 1 506A and application 2 506B, and they can fence each other at the operating system layer between base operating system 1 504A and base operating system 2 504B.

In such examples, application 1 506A might have sent the fencing request because of the missed heartbeat, but be unaware that the heartbeat was missed because a fencing has already been performed on application 2 506B at the operating system layer. That is, base operating system 1 504A can have already performed a soft fence or a hard fence to fence application 2 506B. Where base operating system 1 504A determines that base operating system 1 504A has already been fenced 510, then base operating system 1 504A can send a message indicating fencing success 512 to application 1 506A.

At this point, both a fencing of application 2 506B has been performed, and application 1 506A is informed that its request to fence has been completed, even if application 2 506B was not fenced because of the request 508 from application 1 506A.

FIG. 6 illustrates an example signal flow 600 for high-availability events in a layered architecture where a soft fence is used, in accordance with certain embodiments of this disclosure. As depicted, the signals of signal flow 600 are sent between node 1 602A (comprising base operating system 1 604A and application 1 606A) and node 2 602A (comprising base operating system 2 604A and application 2 606A). In some examples, node 1 602A can be similar to node 1 402A of FIG. 4; base operating system 1 604A can be similar to base operating system 2 404A of FIG. 4; application 1 606A can be similar to application 1 406A of FIG. 4; node 2 602B can be similar to node 2 402B of FIG. 4; base operating system 2 604B can be similar to base operating system 2 404B of FIG. 4; and application 2 606A can be similar to application 1 406A of FIG. 4. Application 1 606A can send fencing request 608 to operating system 1 604A to fence application 2 606B. Fencing request 608 can be similar to fencing request 508 of FIG. 5. In response, base operating system 1 604A can send a request to perform a soft fence 610 to base operating system 2 604B.

In some examples, aspects of signal flow 600 can be combined with aspects of signal flow 400 of FIG. 4, signal flow 500 of FIG. 5, signal flow 700 of FIG. 7, and signal flow 800 of FIG. 8.

Base operating system 2 604B can receive the request to perform a soft fence 610, and in response, send a request to perform a soft fence 612 to application 2 606B. In some examples signal 612 comprises a request sent to application 2 606B for application 2 606B to shut down. In other examples, signal 612 comprises base operating system 2 attempting to soft fence application 2 606B itself, such as by issuing an operating system command to attempt to terminate a process associated with application 2 606B or a container in which it operates.

In some examples where signal 612 comprises base operating system 2 604B sending a request to application 2 604B, then application 2 604B can send signal 614 to base operating system 2 604B that indicates success of the soft fence (there can be examples where the soft fence fails, and this can be communicated back to base operating system 1 604A). In response, base operating system 2 604B can send signal 616 to base operating system 1 604A that the soft fence was successful, and base operating system 1 604A can send signal 618 to application 1 606A that a fence of application 2 606B was successful. At this point, application 1 606A can be aware that application 2 606B has been successfully fenced, though may not be aware that the type of fence was a soft fence.

FIG. 7 illustrates an example signal flow 700 for high-availability events in a layered architecture where a hard fence is used, in accordance with certain embodiments of this disclosure. As depicted, the signals of signal flow 700 are sent between node 1 702A (comprising base operating system 1 704A and application 1 706A) and node 2 702A (comprising base operating system 2 704A and application 2 706A). In some examples, node 1 702A can be similar to node 1 402A of FIG. 4; base operating system 1 704A can be similar to base operating system 2 404A of FIG. 4; application 1 706A can be similar to application 1 406A of FIG. 4; node 2 702B can be similar to node 2 402B of FIG. 4; base operating system 2 704B can be similar to base operating system 2 404B of FIG. 4; and application 2 706A can be similar to application 1 406A of FIG. 4.

In some examples, aspects of signal flow 700 can be combined with aspects of signal flow 400 of FIG. 4, signal flow 500 of FIG. 5, signal flow 600 of FIG. 6, and signal flow 800 of FIG. 8.

Application 1 706A can send fencing request 708 to operating system 1 704A to fence application 2 706B. Fencing request 708 can be similar to fencing request 508 of FIG. 5. In response, base operating system 1 704A can send a request to perform a hard fence 710 to base operating system 2 704B. A hard fence can comprise base operating system 2 704B power cycling itself, or rebooting. As a result of base operating system 2 704B power cycling itself, an application that executes on base operating system 2 704B can be terminated, such as application 2 706B, and a container in which application 2 706B executes.

In some examples, base operating system 2 704B sends signal 712 to indicate that base operating system 2 704B has power cycled or will power cycle. In other examples, signal 712 can be omitted from signal flow 700, because base operating system 1 704A can assume that base operating system 2 704B will power cycle in response to signal 710.

After signal 712 (or where omitted, signal 710), base operating system 1 704A can send signal 714 to application 1 706A to indicate that application 2 706B has successfully been fenced. At this point, application 1 706A can be aware that application 2 706B has been successfully fenced, though may not be aware that the type of fence was a soft fence.

FIG. 8 illustrates an example signal flow 800 for high-availability events in a layered architecture where an application is unfenced, in accordance with certain embodiments of this disclosure. As depicted, the signals of signal flow 800 are sent between node 1 802A (comprising base operating system 1 804A and application 1 806A) and node 2 802A (comprising base operating system 2 804A and application 2 806A). In some examples, node 1 802A can be similar to node 1 402A of FIG. 4; base operating system 1 804A can be similar to base operating system 2 404A of FIG. 4; application 1 806A can be similar to application 1 406A of FIG. 4; node 2 802B can be similar to node 2 402B of FIG. 4; base operating system 2 804B can be similar to base operating system 2 404B of FIG. 4; and application 2 806A can be similar to application 1 406A of FIG. 4.

In some examples, aspects of signal flow 700 can be combined with aspects of signal flow 400 of FIG. 4, signal flow 500 of FIG. 5, signal flow 600 of FIG. 6, and signal flow 700 of FIG. 7.

In signal flow 800, application 1 806A sends unfencing request 808 to base operating system 1 804A. Application 1 806A can send unfencing request 808 after application 1 806A has taken over application 2 806B's services and brought the cluster to a stable state, similar to signal 424 of FIG. 4.

Base operating system 1 804A can receive unfencing request 808 and send unfencing request 810 to base operating system 2 804B. Where base operating system 2 804B was hard fenced (such as in signal flow 700 of FIG. 7), base operating system 804B can have rebooted by this point and be ready to process request from base operating system 1 804A. In examples where base operating system 2 804B was hard fenced, it can be that base operating system 2 804B does not automatically restart application 2 806B as part of base operating system 804B rebooting.

Base operating system 2 804B can start application 2 806B (which may execute in a container), as indicated by signal 812, and determine that application 2 806B has successfully started, as indicated by signal 814. After base operating system 2 804B has determined that application 2 806B has successfully started, base operating system 2 804B can send signal 816 to base operating system 1 804A to indicate that unfencing application 2 806B was successful.

Base operating system 1 804A can then send signal 818 to application 1 806A to indicate that unfencing application 2 806B was successful.

Figure 9:
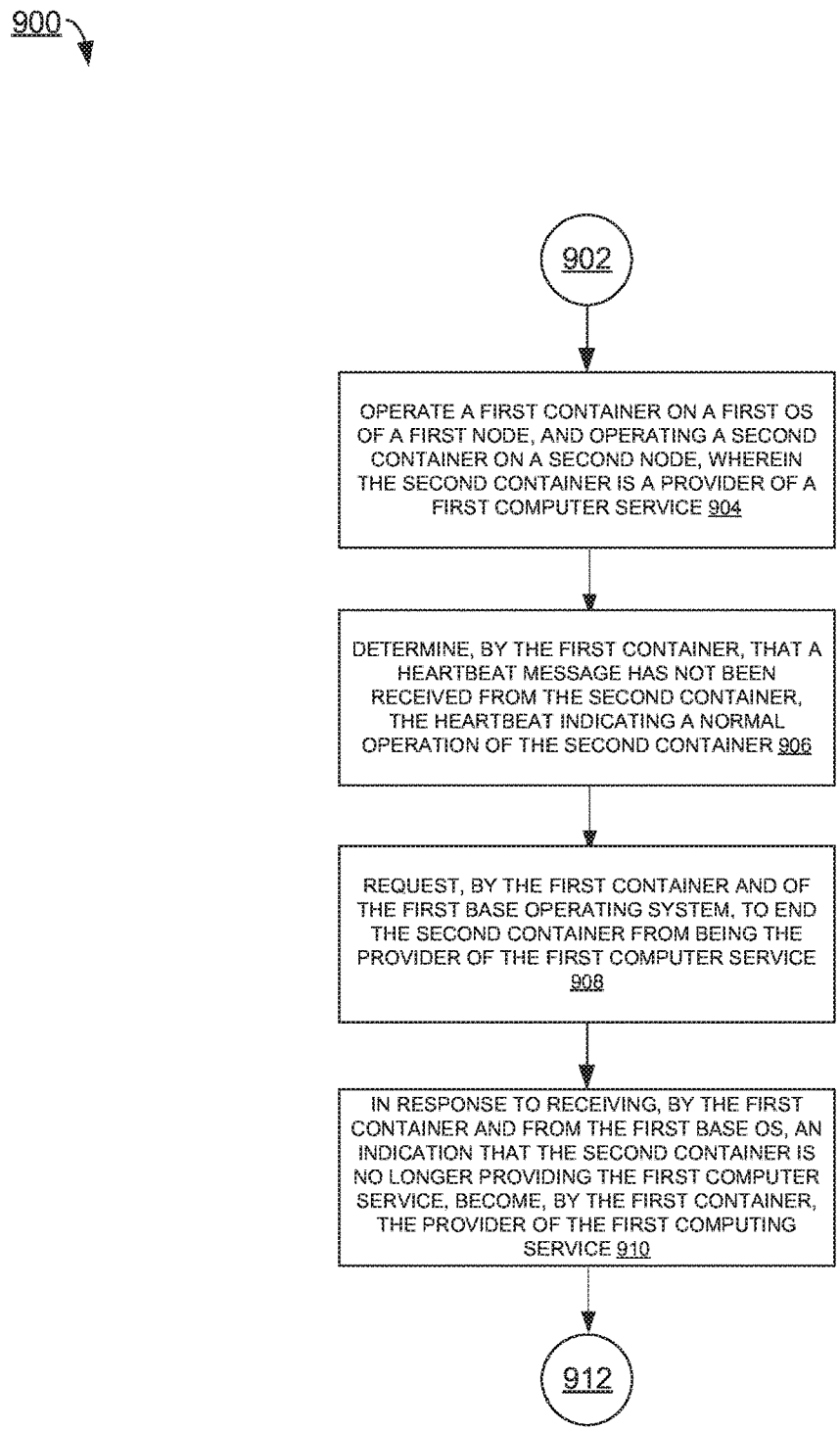
FIG. 9 illustrates an example process flow for high-availability events in a layered architecture, in accordance with certain embodiments of this disclosure.

FIG. 9 illustrates an example process flow 900 for high-availability events in a layered architecture, in accordance with certain embodiments of this disclosure. In some examples, aspects of process flow 900 can be implemented by computing node 102a of FIG. 1.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 1000 of FIG. 10, process flow 1100 of FIG. 1100, and process flow 1200 of FIG. 12.

In general, in process flow 900, a first application in a first container can cause a second application to be fenced by requesting that a first base operating system that hosts the first application to handle the fencing. While the first application may be configured to directly fence the second application, by routing the fencing through the first base operating system, a fencing originated by an application and a fencing originating originated by a base operating system can be coordinated to avoid issues with multiple concurrent fencing operations.

Process flow 900 begins with 902, and moves to operation 904.

Operation 904 depicts operating a first container on a first base operating system of a first node, and operating a second container on a second node, wherein the second container is a provider of a first computer service, and wherein the first container is configured to cause the second container to cease operation independent of operation of the first base operating system. That is, there can be two nodes, each running a base operating system and a container. And the containers (or applications that execute within the containers) can be configured to fence each other.

After operation 904, process flow 900 moves to operation 906.

Operation 906 depicts determining, by the first container, that a heartbeat message has not been received from the second container, the heartbeat indicating a normal operation of the second container. The first container and the second container can exchange periodic heartbeat messages, where a heartbeat message indicates that the sender is operating normally. Where one or more heartbeat messages are not received, the purported receiver can infer that the other container is no longer operating normally and determine to fence the other container.

After operation 906, process flow 900 moves to operation 908.

Operation 908 depicts requesting, by the first container and of the first base operating system, to end the second container from being the provider of the first computer service. Where a container determines to fence the other container, the container can route that request through its base operating system.

After operation 908, process flow 900 moves to operation 910.

Operation 910 depicts, in response to receiving, by the first container and from the first base operating system, an indication that the second container is no longer providing the first computer service, becoming, by the first container, the provider of the first computing service.

In some examples, operation 910 includes determining, by the first base operating system, that the second container has ceased providing the first computer service without additional action by the first base operating system. That is, the first base operating system can determine that the second container has already been fenced, so the first base operating system can return an indication of success to the first container without performing an additional fencing operation.

In some examples, operation 910 includes terminating, by the first base operating system of the first node, the second container of the second node. That is, where the second container has not already been fenced, the first base operating system can fence the second container.

In some examples, operation 910 includes requesting, by the first base operating system, that a second base operating system of the second node terminate the second container. That is, the first base operating system can perform a soft fence on the second container.

In some examples, operation 910 includes instructing, by the first base operating system, that the second base operating system power cycle. That is, the first base operating system can perform a hard fence on the second container.

In some examples, operation 910 includes, in response to determining that the second container has yet to cease being the provider of the first computer service, requesting, by the first base operating system, that a second base operating system of the second node terminate the second container. In some examples, operation 910 also includes, in response to determining that the second base operating system failed to terminate the second container, requesting, by the first base operating system, that the second base operating system undergo a power cycle.

That is, if the second container is already fenced, then success can be returned to the first container. Otherwise, a soft fence can be attempted. If a soft fence works, then success can be returned to the first container. Otherwise, a hard fence can be performed.

After operation 910, process flow 900 moves to 912, where process flow 900 ends.

Figure 10:
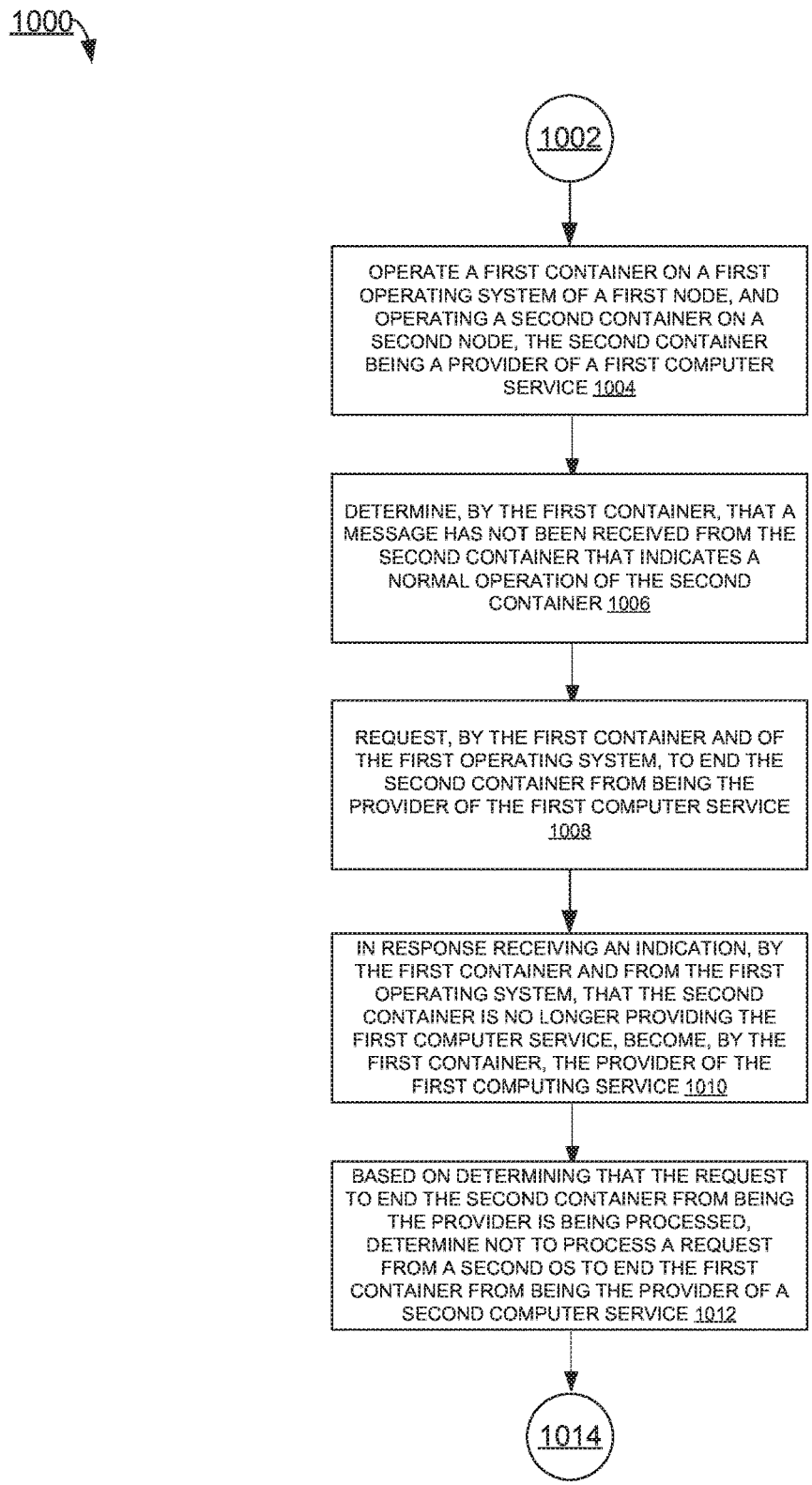
FIG. 10 illustrates another example process flow for high-availability events in a layered architecture, in accordance with certain embodiments of this disclosure.

FIG. 10 illustrates another example process flow 1000 for high-availability events in a layered architecture, in accordance with certain embodiments of this disclosure. In some examples, aspects of process flow 1000 can be implemented by computing node 102a of FIG. 1.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 900 of FIG. 9, process flow 1100 of FIG. 1100, and process flow 1200 of FIG. 12.

Process flow 1000 begins with 1002, and moves to operation 1004.

Operation 1004 depicts operating a first container on a first operating system of a first node, and operating a second container on a second node, the second container being a provider of a first computer service. In some examples, operation 1004 can be implemented in a similar manner as operation 904 of FIG. 9.

In some examples, the first container is configured to cause the second container to cease operation independent of operation of the first operating system, and wherein the second container is configured to cause the first container to cease operation independent of operation of a second operating system of the second node. That is, the two containers are configured to fence each other directly. However, in examples, they route fencing requests through their respective base operating system so that the application-originated fencing requests and the base operating system-originated fencing requests can be coordinated by the base operating system.

After operation 1004, process flow 1000 moves to operation 1006.

Operation 1006 depicts determining, by the first container, that a message has not been received from the second container that indicates a normal operation of the second container. In some examples, operation 1006 can be implemented in a similar manner as operation 1006 of FIG. 9.

After operation 1006, process flow 1000 moves to operation 1008.

Operation 1008 depicts requesting, by the first container and of the first operating system, to end the second container from being the provider of the first computer service. In some examples, operation 1008 can be implemented in a similar manner as operation 908 of FIG. 9.

In some examples, the first container is configured to communicate via a first network address, wherein the first operating system is configured to communicate via a second network address, and wherein the requesting, by the first container and of the first operating system, to end the second container from being the provider of the first computer service comprises establishing, by the first container, a network communications channel between the first container via the first network address and the first operating system via the second network address, the requesting being performed via the network communications channel. That is, the first container can use a secure shell (SSH) channel (or similar network communications channel) to communicate with the first base operating system. In some examples, the first container receives an indication that the second container is no longer providing the first computer service via the network communications channel. That is, the first base operating system can use that same network communications channel to respond to the first container.

After operation 1010, process flow 1000 moves to operation 1010.

Operation 1010 depicts in response receiving an indication, by the first container and from the first operating system, that the second container is no longer providing the first computer service, becoming, by the first container, the provider of the first computing service. In some examples, operation 1010 can be implemented in a similar manner as operation 910 of FIG. 9.

In some examples, operation 1010 includes, after the first container performs the becoming of the provider of the first computing service, requesting, by the first container and of the first operating system, to resume the operating of the second container. That is, the first container can initiate the unfencing of the second container via the first base operating system after the first container has taken over the second container's services.

In some examples, operation 1010 includes in response to the requesting, by the first container and of the first operating system, to resume the operating of the second container, requesting, by the first operating system and to a second operating system of the second node, to resume the operating of the second container. That is, an unfencing originated by the first container can be passed to the first base operating system, then to the second base operating system, which can restart the second container.

After operation 1010, process flow 1000 moves to operation 1012.

Operation 1012 depicts based on determining, by the first operating system, that the request to end the second container from being the provider of the first computer service is being processed, determining not to process a request from a second operating system of the second node to end the first container from being the provider of a second computer service. That is, the first base operating system can block a request from the second base operating system to fence the first container while the first base operating system is processing a fencing of the second container.

After operation 1012, process flow 1000 moves to operation 1014, where process flow 1000 ends.

Figure 11:
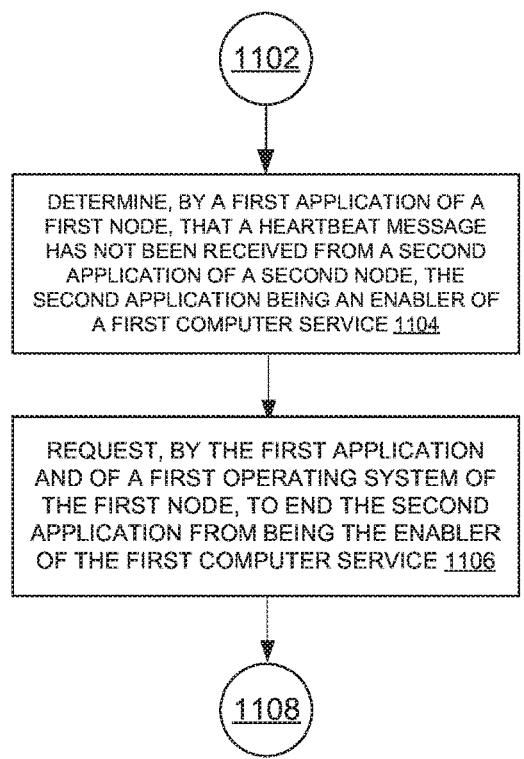
FIG. 11 illustrates another example process flow for high-availability events in a layered architecture, in accordance with certain embodiments of this disclosure.

FIG. 11 illustrates another example process flow 1100 for high-availability events in a layered architecture, in accordance with certain embodiments of this disclosure. In some examples, aspects of process flow 1100 can be implemented by computing node 102a of FIG. 1.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 900 of FIG. 9, process flow 1000 of FIG. 1000, and process flow 1200 of FIG. 12.

Process flow 1100 begins with 1102, and moves to operation 1104.

Operation 1104 depicts determining, by a first application of a first node, that a heartbeat message has not been received from a second application of a second node, the second application being an enabler of a first computer service. In some examples, operation 1104 can be implemented in a similar manner as operation 904 of FIG. 9.

In some examples, the first application and the second application operate as part of a high-availability service. In some examples, the first application and the second application each have access to a shared computer storage. That is, the first application and the second application are part of a storage cluster.

In some examples, the heartbeat message indicates a normal operation of the second application. In some examples, the heartbeat message is part of a first group of heartbeat messages, wherein the first application periodically sends one of a second group of heartbeat messages to the second application, and wherein the second application periodically sends one of the first group of heartbeat messages to the first application. That is, the first application and the second application can periodically exchange heartbeat messages to indicate that the sender is operating normally.

After operation 1104, process flow 1100 moves to operation 1106.

Operation 1106 depicts requesting, by the first application and of a first operating system of the first node, to end the second application from being the enabler of the first computer service. In some examples, operation 1106 can be implemented in a similar manner as operation 908 of FIG. 9.

In some examples, operation 1106 comprises, in response receiving an indication, by the first application and from the first operating system, that the second application is no longer enabling the first computer service, becoming, by the first application, the enabler of the first computing service. In some examples, this aspect operation 1106 can be implemented in a similar manner as operation 1010 of FIG. 10.

After operation 1106, process flow 1100 moves to 1108, where process flow 1100 ends.

Figure 12:
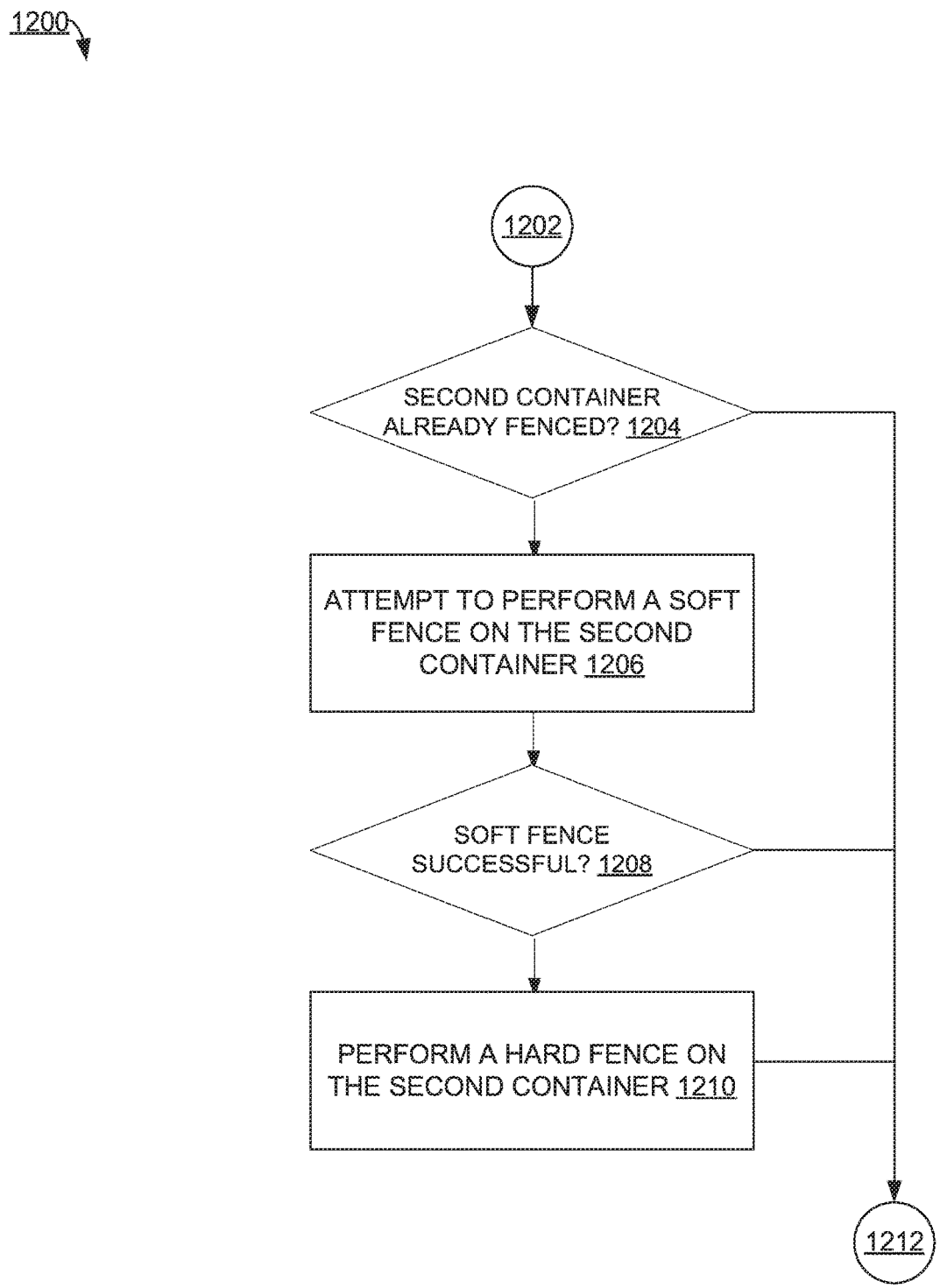
FIG. 12 illustrates another example process flow for high-availability events in a layered architecture, where a fencing request is processed, in accordance with certain embodiments of this disclosure.

FIG. 12 illustrates another example process flow 1200 for high-availability events in a layered architecture, where a fencing request is processed, in accordance with certain embodiments of this disclosure. In some examples, aspects of process flow 1200 can be implemented by node 102a of FIG. 1.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with aspects of one or more of process flow 900 of FIG. 9, process flow 1000 of FIG. 1000, and process flow 1100 of FIG. 11.

Process flow 1200 begins with 1202, and moves to operation 1204.

Operation 1204 depicts determining whether the second container is already fenced. Where it is determined in operation 1204 that the second container is already fenced, process flow 1200 moves to 1212, where process flow ends. Instead, where it is determined in operation 1204 that the second container is not already fenced, process flow 1200 moves to operation 1206.

Operation 1206 is reached from operation 1204 where it is determined in operation 1204 that the second container is not already fenced. Operation 1206 depicts attempting to perform a soft fence on the second container. After operation 1206, process flow 1208 moves to operation 1208.

Operation 1208 depicts determining whether performing a soft fence was successful. Where it is determined in operation 1208 that performing a soft fence was successful, process flow 1200 moves to 1212 where process flow 1200 ends. Instead, where it is determined in operation 1208 that performing a soft fence was not successful, process flow 1200 moves to operation 1210.

Operation 1210 is reached from operation 1208 where it is determined in operation 1208 that a soft fence was not successful. Operation 1210 depicts performing a hard fence on the second container. After operation 1210, process flow 1200 moves to 1212 where process flow 1200 ends.

Example Operating Environment

Figure 13:
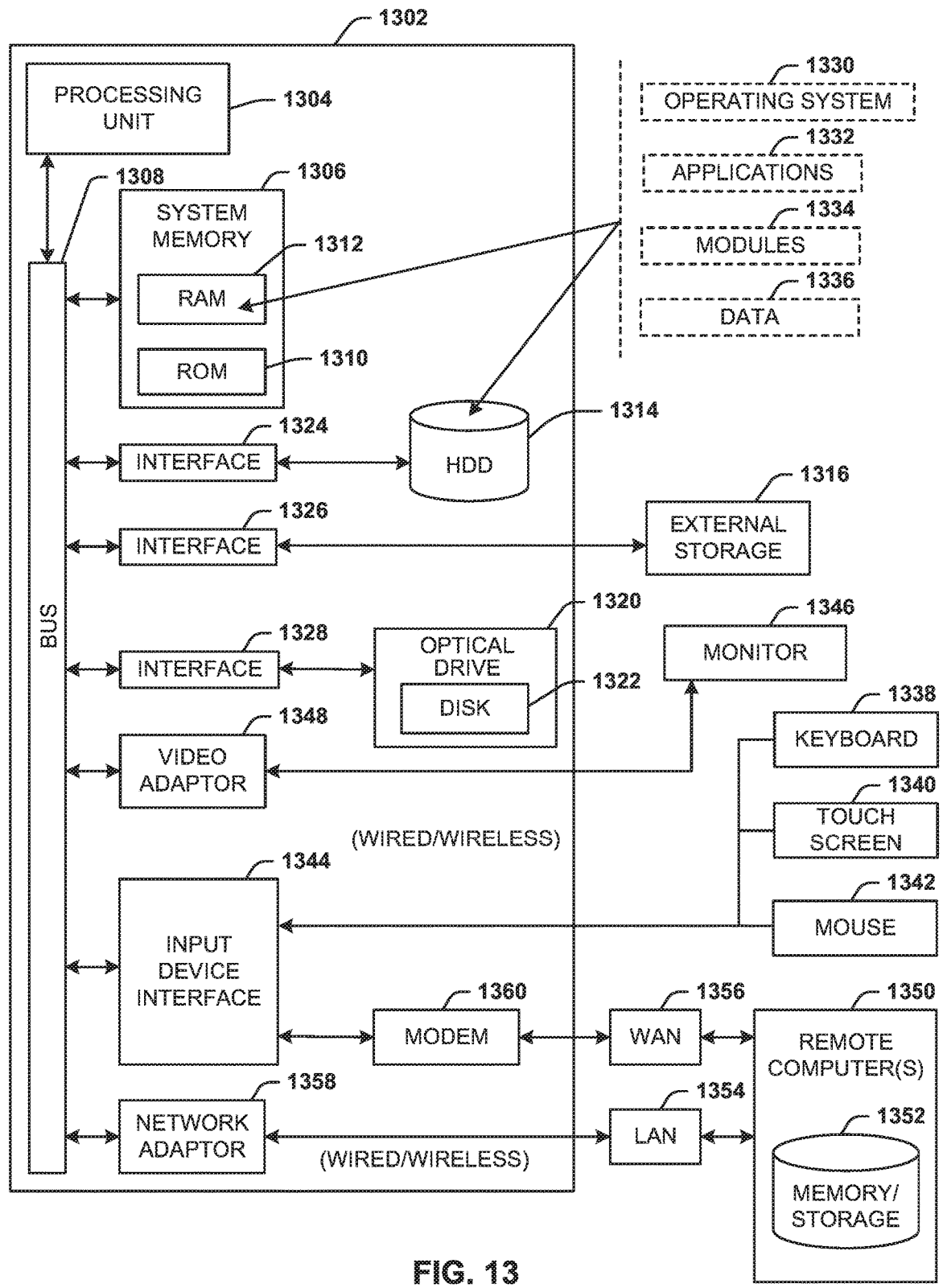
FIG. 13 illustrates an example block diagram of a computer operable to execute certain embodiments of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, aspects of computing environment 1300 can be used to implement aspects of computing node 102a and/or computing node 102b of FIG. 1. In some examples, computing environment 1300 can implement aspects of the process flows of FIGS. 9-12 to facilitate high-availability events in a layered architecture.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a processor; and
a memory that stores executable instructions that, when executed by the processor, facilitate performance of operations, comprising:
operating a first container on a first base operating system of a first node, and operating a second container on a second node, wherein the second container is a provider of a first computer service, and wherein the first container is configured to cause the second container to cease operation independent of operation of the first base operating system;
determining, by the first container, that a heartbeat message has not been received from the second container, the heartbeat indicating a normal operation of the second container;
requesting, by the first container and of the first base operating system, that the first base operating system cause the second container to cease being the provider of the first computer service; and
in response to receiving, by the first container and from the first base operating system, an indication that the second container is no longer providing the first computer service, becoming, by the first container, the provider of the first computer service.

2. The system of claim 1, wherein the receiving of the indication that the second container is no longer providing the first computer service comprises:
determining, by the first base operating system, that the second container has ceased providing the first computer service without additional action by the first base operating system.

3. The system of claim 1, wherein the receiving of the indication that the second container is no longer providing the first computer service comprises:
terminating, by the first base operating system of the first node, the second container of the second node.

4. The system of claim 1, wherein the ending of the second container from being the provider of the first computer service comprises:
requesting, by the first base operating system, that a second base operating system of the second node terminate the second container.

5. The system of claim 1, wherein the receiving of the indication that the second container is no longer providing the first computer service comprises:
instructing, by the first base operating system, that the second base operating system power cycle.

6. The system of claim 1, wherein the receiving of the indication that the second container is no longer providing the first computer service comprises:
in response to determining that the second container has yet to cease being the provider of the first computer service, requesting, by the first base operating system, that a second base operating system of the second node terminate the second container.

7. The system of claim 6, wherein the operations further comprise:
in response to determining that the second base operating system failed to terminate the second container, requesting, by the first base operating system, that the second base operating system undergo a power cycle.

8. A method, comprising:
operating, by a system comprising a processor, a first container on a first operating system of a first node, and operating a second container on a second node, the second container being a provider of a first computer service;

determining, by the first container, that a message has not been received from the second container that indicates a normal operation of the second container;

requesting, by the first container and of the first operating system, that the first base operating system cause the second container to cease being the provider of the first computer service; and in response receiving an indication, by the first container and from the first operating system, that the second container is no longer providing the first computer service, becoming, by the first container, the provider of the first computer service.

9. The method of claim 8, wherein the first container is configured to cause the second container to cease operation independent of operation of the first operating system, and wherein the second container is configured to cause the first container to cease operation independent of operation of a second operating system of the second node.

10. The method of claim 8, further comprising:

based on determining, by the first operating system, that the request to end the second container from being the provider of the first computer service is being processed, determining not to process a request from a second operating system of the second node to end the first container from being the provider of a second computer service.

11. The method of claim 10, wherein the first container is configured to communicate via a first network address, wherein the first operating system is configured to communicate via a second network address, and wherein the requesting, by the first container and of the first operating system, to end the second container from being the provider of the first computer service comprises:

establishing, by the first container, a network communications channel between the first container via the first network address and the first operating system via the second network address, the requesting being performed via the network communications channel.

12. The method of claim 11, wherein the first container receives the indication that the second container is no longer providing the first computer service via the network communications channel.

13. The method of claim 8, further comprising:

after the first container performs the becoming of the provider of the first computer service, requesting, by the first container and of the first operating system, to resume the operating of the second container.

14. The method of claim 13, further comprising:

in response to the requesting, by the first container and of the first operating system, to resume the operating of the second container, requesting, by the first operating system and to a second operating system of the second node, to resume the operating of the second container.

15. A non-transitory computer-readable medium comprising instructions that, in response to execution, cause a system comprising a processor to perform operations, comprising:

determining, by a first application of a first node, that a heartbeat message has not been received from a second application of a second node, the second application being an enabler of a first computer service; and requesting, by the first application and of a first operating system of the first node, that the first operating system cause the second application to cease being the enabler of the first computer service.

16. The non-transitory computer-readable medium of claim 15, wherein the operations further comprise:

in response receiving an indication, by the first application and from the first operating system, that the second application is no longer enabling the first computer service, becoming, by the first application, the enabler of the first computer service.

17. The non-transitory computer-readable medium of claim 15, wherein the heartbeat message indicates a normal operation of the second application.

18. The non-transitory computer-readable medium of claim 15, wherein the heartbeat message is part of a first group of heartbeat messages, wherein the first application periodically sends one of a second group of heartbeat messages to the second application, and wherein the second application periodically sends one of the first group of heartbeat messages to the first application.

19. The non-transitory computer-readable medium of claim 15, wherein the first application and the second application operate as part of a high-availability service.

20. The non-transitory computer-readable medium of claim 15, wherein the first application and the second application each have access to a shared computer storage.

\* \* \* \* \*